W. S. DAVENPORT.
DIRECT READING MICROMETER CALIPER.
APPLICATION FILED JUNE 16, 1915.
1,210,051.
Patented Dec. 26, 1916.
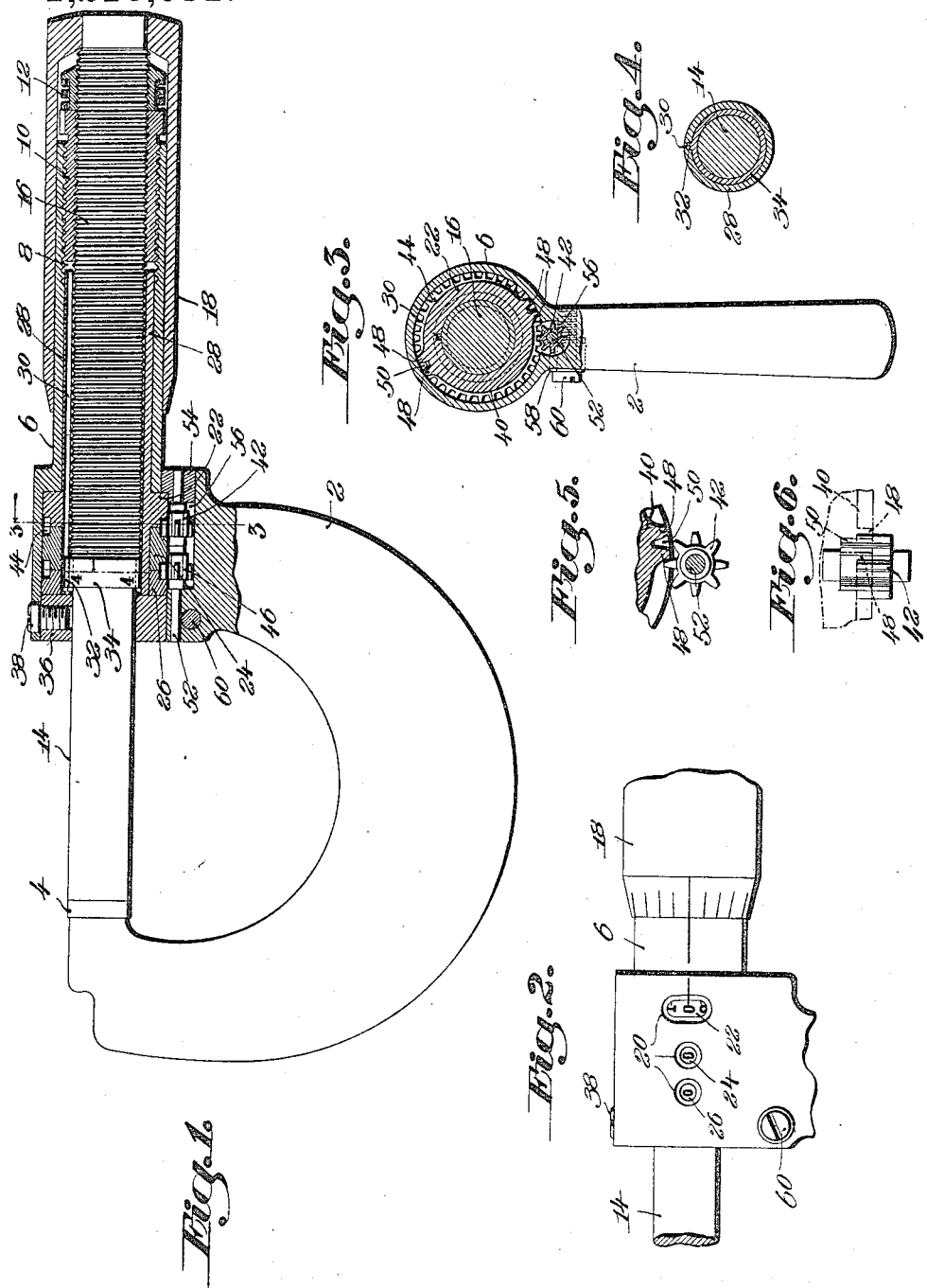
Witness
Frederick S. Greenleaf.
Inventor
William S. Davenport
by Phillips Van Everen & Fish
Attys

UNITED STATES PATENT OFFICE.

WILLIAM S. DAVENPORT, OF NEW BEDFORD, MASSACHUSETTS.

DIRECT-READING MICROMETER-CALIPER.

1,210,051.  Specification of Letters Patent.  Patented Dec. 26, 1916.

Application filed June 16, 1915. Serial No. 34,417.

*To all whom it may concern:*

Be it known that I, WILLIAM S. DAVENPORT, a citizen of the United States, residing at New Bedford, in the county of Bristol and State of Massachusetts, have invented certain new and useful Improvements in Direct-Reading Micrometer-Calipers; and I do hereby declare the following to be a full, clear, and exact description of the invention, such as will enable others skilled in the art to which it appertains to make and use the same.

The invention relates to direct reading micrometer calipers.

The object of the invention is to provide a novel and improved construction in which the counting and indicating mechanism for indicating in figures any setting of the caliper is simple and compact, and is well adapted to be embodied in calipers having a hub and thimble arranged and manipulated in setting the caliper in the same manner as in calipers which have been on the market, and with which operators have become familiar.

To these ends the invention consists of the features of construction and combinations of parts hereinafter described and referred to in the claims, the advantages of which will be apparent to those skilled in the art from the following detailed description of the caliper in which the preferred form of the invention has been embodied.

In the drawings, Figure 1 is a sectional elevation on an enlarged scale of a caliper embodying the invention in its preferred form; Fig. 2 is a fragmentary elevation showing the location of the openings through which the setting of the caliper is read; Fig. 3 is a transverse sectional view on line 3—3, Fig. 1; Fig. 4 is a transverse sectional view through the spindle and unit dial of the sleeve, taken on line 4—4, Fig. 1; and Figs. 5 and 6 are details showing the carrying mechanism for carrying from one dial to another.

The caliper shown in the drawings comprises a U-shaped frame 2, one arm of which is provided with the anvil 4, and the other arm of which is provided with the hub 6, and supports the spindle and the devices for operating it and for indicating the setting of the caliper. The hub 6 is provided with a bore 8 which is internally threaded at its outer end to receive the micrometer nut 10. The nut may be of any suitable construction, and as shown, is formed in two sections connected by interlocking teeth, the outer section being forced outward by a spring 12 to take up any back-lash or wear in the screw of the spindle. The spindle 14 is mounted within the hub 6, and is provided with a screw 16 engaging the nut 10. A thimble 18 is secured to the outer end of the spindle and surrounds the hub 6. The inner end of the thimble is beveled, and may be provided with graduations to coöperate with a base line on the hub in indicating thousandths or fractions of thousandths in the setting of the caliper.

As thus far described, the caliper is similar in construction to calipers in general use, and the manipulation of the thimble and spindle in setting the caliper is that with which operators are generally familiar.

In the construction shown, the mechanism for indicating in figures the setting of the caliper comprises a series of dial wheels mounted within a counterbore formed at the inner end of the bore 8 and connected to be operated from the spindle. Each dial wheel is provided on its periphery with twenty figures, arranged in series of ten, and the frame 2 is provided with openings 20 with which the figures on the dials register, and through which a direct reading of the setting of the caliper may be made. As shown, there are three dials 22, 24 and 26 mounted within the frame, the dial 22 being connected to turn in unison with the spindle, and the figures thereon being arranged to indicate thousandths in the setting of the caliper. The dial 24 is operated from the dial 22 by carrying and counting gears, and the figures thereon are arranged to indicate hundredths in the setting of the caliper. The dial 26 is operated from the dial 24 through carrying and counting gears, and the figures thereon are arranged to indicate tenths in the setting of the caliper. In the construction shown the screw 16 is fifty threads to the inch, and a half turn of the screw therefore moves the spindle 1/100 of an inch. The carrying and counting gears for operating the dial 24, and for operating the dial 26, are therefore so constructed that the dial 24 is advanced a step, or the distance from one figure thereon to another every half revolution of the spindle, and the dial 26 is advanced a step every half revolution of the dial 24. For indicating the fractions of a thousandth the end of the thimble 18 may be provided with graduations (20 in the construction shown) which coöperate with a base line on the hub 6 in the usual manner, or the face of the dial 20 may be provided with graduations arranged to coöperate with a line on the frame in indicating thousandths and fractions thereof, as indicated in Fig. 2, or if found desirable, graduations on both the dial and thimble may be provided. In the construction shown the indicating dials are operated from the spindle through a sleeve 28 mounted within the bore of the hub 6, and provided with a keyway 30 which is engaged by a key 32 projecting from a collar 34 which is formed or secured on the spindle 14 at the inner end of the screw 16. As the spindle is turned, the collar travels back or forth within the sleeve, the key and keyway forming an efficient and durable sliding coupling for causing the sleeve to turn in unison with the spindle. This manner of connecting the spindle and indicating mechanism also avoids any mutilation of the screw which would tend to impair its accuracy, and also avoids mutilation of the cylindrical part of the spindle, which might result in the admission of dirt or injurious matter to the interior of the hub. The thousandths dial 22 is either formed integrally with or secured to the sleeve so that it turns therewith. The dials 24 and 26 are mounted to turn on the end of the sleeve. The dials and sleeve are retained in place within the counterbore in the arm and the bore in the hub by a bushing 36 which closely surrounds the spindle and fits within the counterbore. The bushing is held in place by a screw 38.

The carrying and counting gears for connecting the dial 22 with the dial 24 comprise a mutilated carrying gear 40 formed on or secured to the dial 22, a carrying pinion 42 mounted within a recess within the frame 2, and a counting gear 44 formed on or secured to the dial 24. The dial 26 is operated from the dial 24 through similar gears and a similar carrying pinion 46. The carrying pinions are provided with alternating long and short teeth, the short teeth extending only far enough to be engaged by the carrying teeth 48 of the carrying gear 40, while the long teeth extend far enough to overlie the periphery of the dial 22. The tooth space 50 between the carrying teeth 48 extends across the face of the dial 22 far enough to receive and coöperate with the long teeth of the carrying pinion. During the turning of the spindle and dial 22 from one carrying point to the other, two of the long teeth ride on the periphery of the dial, thus locking the carrying pinion and the dial 24 in position, the intermediate short tooth projecting into the annular groove between the two sets of carrying teeth. When the carrying point is reached in the rotation of the spindle, one of the teeth 48 engages this projecting short tooth and turns the carrying pinion, the tooth space 50 at this time being in position to allow a long tooth to enter it. The carrying teeth 48 operating on the short and long teeth turn the pinion the distance of two teeth, the succeeding long tooth then engaging the periphery of the dial and coöperating with the preceding long tooth to lock the pinion and dial 24 in position until the next carrying point is reached. The operation of the carrying gear, pinion 46 and counting gear which connect the dials 24 and 26 is the same.

The carrying pinions 42 and 46 are mounted to turn freely on a pin 52, the outer end of which carries a bushing 54 which fits within the end of the bore 56 formed in the frame for the reception of the carrying pinion. The other end of the pin 52 fits within a hole in the frame, and the pin is locked in position to hold the hubs of the pinions snugly against each other, and against the bushing 54 and end of the bore, by a clamping sleeve 58 forced against the pin by a clamping screw 60. This construction enables the recess for the reception of the carrying pinions to be readily formed in the manufacture of the caliper, and also enables the parts to be quickly and conveniently assembled.

It will be observed that by mounting the initial dial wheel 22 upon an elongated sleeve and journaling this sleeve in the hub in such manner that it shall lie between the hub and the threaded part of the spindle, I provide for a maximum range of movement of the spindle without in the least mutilating the threaded part of the spindle or even the smooth projecting part of the spindle and also without unduly lengthening the handle member of the instrument. This arrangement of the sleeve also permits me to extend the sleeve inwardly beyond the dial wheel 22 and thus increase the range of movement of the spindle to that extent and also to provide a convenient journal for the additional dial wheels 24 and 26. This construction also enables me to mount all the dial wheels in a counterbore in the hub, which counterbore opens at the inner end of the hub and thus provides for quickly and easily assembling the parts in the instrument. The counterbore, as hereinbefore stated, is closed by removable bushing 36, through which the smooth part of the spindle works, whereby the bushing serves not only as a guide for the spindle but also as a means for locking all the parts in their proper assembled relation in the counterbore. It will be noted also that the collar 34 not only affords a substantial means for supporting the key 32 and connecting it to the spindle, but may also act as an additional guide and support for the spindle at points along the interior of the sleeve 28 intermediate the nut 10 and the bushing 36, thereby contributing to accuracy and ease of movement of the spindle. It will be observed also that the key 32 and the sleeve having an interior keyway form an effective sliding coupling connecting the spindle to the units dial.

While it is preferred to employ the specific construction and arrangement of the parts shown and described, it will be understood that this construction and arrangement is not essential to the broader features of the invention, and may be varied or modified as found desirable or best suited to the construction of caliper in which the invention is to be embodied.

Having explained the nature and object of the invention, and specifically described one form of mechanism in which it may be embodied, what is claimed is:—

1. A micrometer caliper, having, in combination, a frame provided with an anvil and a hub, a nut fixed in the hub, a spindle within the hub having a screw engaging the nut, a thimble secured to the spindle and surrounding the hub, a short projection on the spindle, a sleeve mounted to turn in the hub between the same and the threaded part of the spindle and provided interiorly with a longitudinal recess along which the projection on the spindle travels as the spindle is turned, an indicating dial turning with the sleeve, indicating dials concentric with the sleeve and spindle, and carrying mechanism between the dials.

2. A micrometer caliper, having, in combination, a frame provided with an anvil and a hub, a nut in the hub at the outer end thereof, a spindle within the hub having a screw engaging the nut, a thimble secured to the spindle and surrounding the hub, a short projecting key on the spindle at the inner end of the screw, a rotatable sleeve within the hub having a keyway in its inner surface along which the key travels as the spindle is turned, an indicating dial carried by the sleeve, indicating dials surrounding the sleeve and spindle, and carrying mechanism between the dials.

3. A micrometer caliper, having, in combination, a frame provided with an anvil and a hub, a nut in the hub, a spindle within the hub having a screw engaging the nut, a thimble secured to the spindle and surrounding the hub, a sleeve within the hub provided interiorly with a keyway, a collar on the spindle slidable in the sleeve and provided with a key engaging the keyway, and indicating dials actuated by the rotation of the sleeve.

4. A micrometer caliper, having, in combination, a frame provided with an anvil and a hub, a nut in the hub, a spindle within the hub having a screw engaging the nut, a sleeve within the hub having an interior keyway, a collar on the spindle slidably fitting the sleeve and provided with a key engaging the keyway, and indicating dials actuated by the rotation of the sleeve.

5. A micrometer caliper, having, in combination, a frame provided with an anvil and a hub, a bore being formed in the hub, a nut in the outer end of the bore, a spindle provided with a screw engaging the nut, a counterbore being formed in the frame at the inner end of the bore in the hub, indicating dials within the counterbore, a removable bushing fitted in the end of the counterbore surrounding the spindle, a sliding coupling between one dial and the spindle, and carrying devices connecting the dials.

6. A micrometer caliper, having, in combination, a frame provided with an anvil and a hub, a bore being formed in the hub, a nut in the outer end of the bore, a spindle provided with a screw engaging the nut, a counterbore being formed in the frame at the inner end of the bore in the hub, a sleeve surrounding the spindle between the same and the interior of the hub and provided with a keyway, a collar on the spindle provided with a key engaging the keyway, an indicating dial secured on the sleeve within the counterbore, indicating dials mounted on the sleeve within the counterbore, a bushing fitted in the end of the counterbore surrounding the spindle, and carrying devices connecting the dials.

7. A micrometer caliper, having, in combination, a frame provided with an anvil and a hub, a bore being formed in the hub, a nut in the outer end of the bore, a spindle provided with a screw engaging the nut, a counterbore being formed in the frame at the inner end of the bore in the hub, a sleeve surrounding the spindle and journaled in the bore of the hub, a sliding coupling connecting the sleeve and spindle, an indicating dial secured on the sleeve within the counterbore, indicating dials within the counterbore, another bore being formed in the frame at one side of the counterbore, and carrying pinions for connecting the dials mounted in said bore.

8. A micrometer caliper, having in combination, a frame provided with an anvil and a hub, a bore being formed in the hub, a nut in the outer end of the hub, a spindle provided with a screw engaging the nut, a counterbore being formed in the frame at the inner end of the bore in the hub, a sleeve surrounding the spindle between the same and the interior of the hub, a sliding coupling between the sleeve and spindle, an indicating dial secured upon the sleeve, indicating dials mounted on the sleeve, another bore being formed at one side of the counterbore, a pin provided at one end with a bushing to fit the end of this latter bore, a hole in the frame for receiving the other end of the pin, and carrying pinions mounted on the pin between the bushing and the end of the bore for connecting the dials.

9. A micrometer caliper having in combination a frame provided with an anvil and a hub, this hub being provided with a bore, an elongated sleeve journaled in said bore and carrying a dial wheel and provided with an interior longitudinal key-way, a spindle extending through said bore and said sleeve and provided with a key slidable in said key-way, screw means for advancing and retracting the spindle as it is turned, additional dial wheels within the hub, and carrying mechanism between the dials.

10. A micrometer caliper, having in combination a frame provided with an anvil and a hub, this hub being provided with a bore extending through it, this bore being counterbored at the inner end of the hub, a sleeve journaled in the bore and carrying a dial wheel lying in the counterbore, a spindle extending through the sleeve and both the bore and the counterbore, screw means for advancing and retracting the spindle as it is turned, a sliding coupling device between the spindle and the sleeve whereby the sleeve is turned with the spindle at all points in its adjustment, additional dial wheels located in the counterbore and journaled on the sleeve, a closure means for the counterbore serving as a guide to the spindle, and carrying mechanism between the dials.

WILLIAM S. DAVENPORT.

Copies of this patent may be obtained for five cents each, by addressing the "Commissioner of Patents, Washington, D. C."